Jan. 30, 1968     M. FEINBERG     3,366,328
MIXING VALVE

Filed April 12, 1965     2 Sheets-Sheet 1

INVENTOR
MAURICE FEINBERG

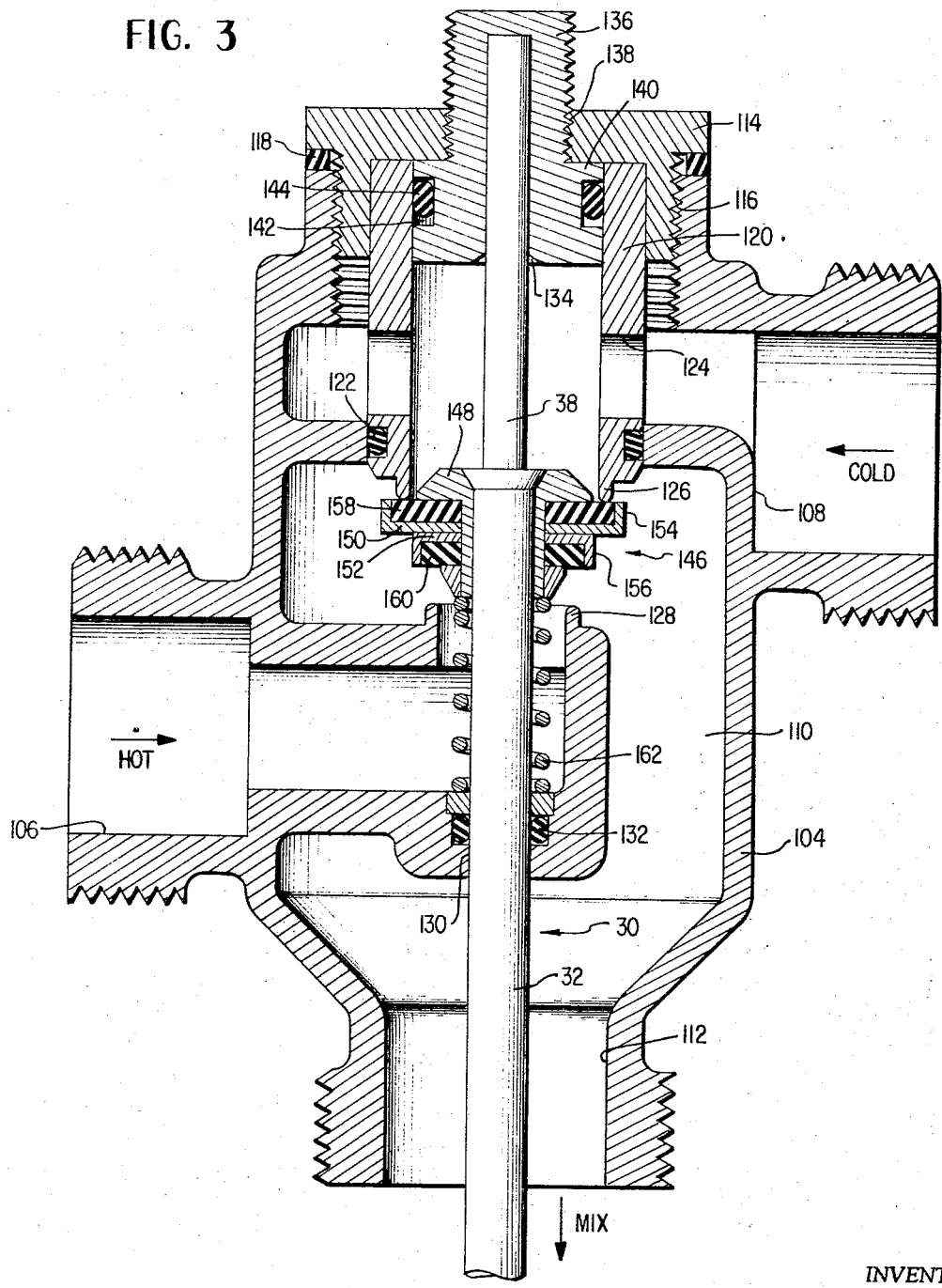

United States Patent Office 3,366,328
Patented Jan. 30, 1968

3,366,328
MIXING VALVE
Maurice Feinberg, 2 Jackson St., Waltham,
Mass. 02154
Filed Apr. 12, 1965, Ser. No. 447,232
3 Claims. (Cl. 236—12)

This invention relates to fluid mixing valves generally, and more particularly to an improved mixing valve adapted to provide effective and simultaneous control of the volume of both hot and cold fluid passing through the valve.

Presently known fluid mixing valves incorporate a variety of varying structural features, but invariably most of these valves employ a basic housing design and principle of operation. Regardless of the structural features peculiar to each of the known mixing valves, most of these valves generally are designed to operate with a fixed supply of hot fluid. When the temperature of this fluid exceeds the temperature settings of the valve, cold fluid is admitted into the valve body in amounts sufficient to lower the temperature of the fluid leaving the valve, but it is the volume of cold fluid, not hot, which is varied.

In valves where a fixed supply of hot fluid is maintained, the operation of the valve is generally controlled by a sensing unit responsive to the temperature of the hot fluid. This method of valve control has been a primary contributing factor to the inaccuracies often experienced with presently known mixing valves, for accurate temperature control of the mixed fluid output of a mixing valve is difficult to achieve when the valve control element is responsive only to the heated fluid input. Such valve control elements do not respond to temperature variations in the mixed fluid output, and thus no temperature control is present after mixing occurs.

More serious than the output temperature variations experienced with mixing valves employing a fixed supply of heated fluid are the dangers resulting from a failure to maintain a supply of cold fluid to such valves. In the event the cold fluid supply fails, only hot fluid will flow through the mixing valve and the output of the valve will constitute an uncontrolled flow of heated fluid of indeterminate temperature. When such valves are employed as water mixing valves for faucets or showers, severe scalding may result upon the failure of a flow of cold water to the valve.

When conventional mixing valves are to be employed within a fluid system, such valves must be trapped, and therefore installed only in specified locations within the system. Trapping is an essential, and means that the valve must be installed below the level of a tankless heater, hot water storage tank, or other heated storage unit in order to prevent hot water or fluid circulation, due to radiation and convection, into the cold water or fluid lines. Such circulation is prevented by trapping the valve, but failure to do so results in the movement of hot water or fluid up the cold water or fluid lines by means of radiation and/or convection, with the result that, in water systems, scalding might occur from a cold water line.

The undesirable features prevalent in existing fluid mixing valves have led to a need for the development of an improved fluid mixing valve capable of providing the accuracy, safety, and versatility unobtainable with conventional valves of known design.

The primary object of the present invention is to provide a novel and improved fluid mixing valve which is adapted to exercise precise temperature control over a mixed fluid output under widely varying conditions of temperature and pressure.

Another object of the present invention is to provide a novel and improved fluid mixing valve that is trapless and which may be installed at any location within a fluid system.

A further object of this invention is to provide a novel and improved fluid mixing valve which includes a thermal actuator controlled by the temperature of the mixed fluid.

Another object of this invention is to provide a novel and improved mixing valve which functions to simultaneously regulate the fluid flow from both the hot and cold fluid valve inlets to accurately control the desired temperature of the mixed output fluid.

A further object of this invention is to provide a novel and improved mixing valve which operates to automatically shut off the hot fluid supply to the valve in the event of a failure in the cold fluid supply and, conversely, to shut off the cold fluid supply in the event of a failure in the hot fluid supply.

Another object of this invention is to provide a novel and improved fluid mixing valve incorporating a thermally responsive valve actuator which operates in response to fluid temperature conditions prevalent throughout the mixing chamber of the mixing valve and which is insensitive to pressure variations in the mixing chamber.

A still further object of this invention is to provide a novel and improved mixing valve incorporating a temperature responsive valve actuator which employs a thermo-sensitive plastic as the expandable drive element.

With the foregoing and other objects in view, the invention resides in the following specification and appended claims, certain embodiments and details of construction of which are illustrated in the accompanying drawings in which:

FIGURE 3 is a vertical cross sectional view illustrating an embodiment of the mixing valve of the present invention.

In the novel mixing valve of the present invention, the employment of unique housing design features in conjunction with a novel thermo-responsive control element, provides for the simultaneous control or balancing of the input volume of both the hot and cold fluid passing through the valve. Although the mixing valve of this invention may be effectively employed in fluid systems for controlling a wide variety of different fluids, the valve will hereinafter be characterized as a water mixing valve for purposes of descriptive clarity. Although valves of this type are most often employed with water systems, it must be understood that the present invention is in no way limited to use solely with such systems.

The design of the mixing valve of the present invention enables this valve to provide a continuous balancing of hot and cold fluid entering the valve over a widely varying range of temperatures and pressures. Due to the valve design and the superior thermal expansion characteristics of the specific thermally responsive control unit used, the present mixing valve delivers a much greater flow of mixed fluid with greater accuracy of temperature control than can be achieved with conventional mixing valves of comparable size. The thermally responsive control unit employed with the valve is extremely responsive to the temperature of the mixed fluid or water within the valve mixing chamber and generates a great force in response to slight temperature variations. Other thermal expansion devices, such as bellows, diaphragms, expansion units using a rubber power expansion element, or expansion units using power elements other than a thermally expandable plastic, cannot be adequately substituted for the expansion element employed in the valve of the present invention, for such units are incapable of moving large forces over great distances and rapidly evidence fatigue. However, a thermo-actuator employing a thermally responsive plastic is capable of generating a great force to render possible continuous and accurate mixing control in an atmosphere of high fluid pressure.

Figure 1:
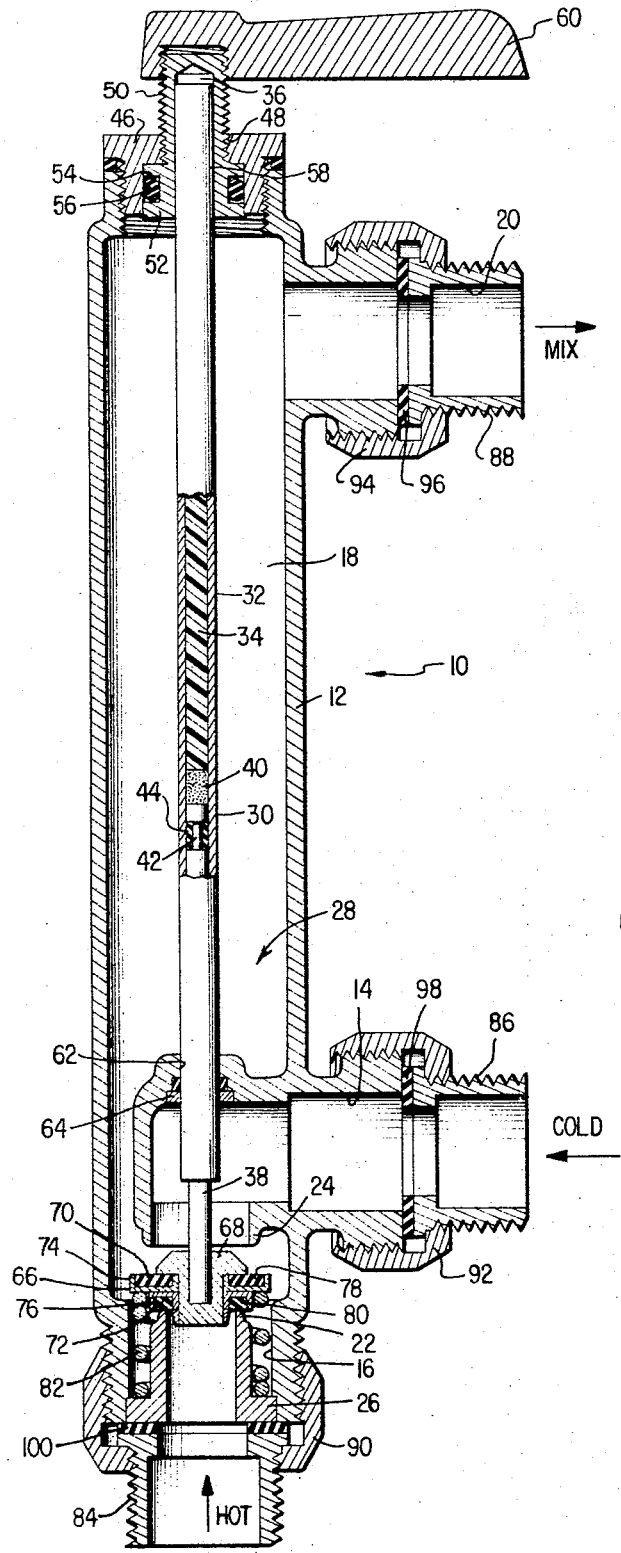
FIGURE 1 is a vertical cross sectional view of the mixing valve of the present invention.

The fluid mixing valve of the present invention may best be understood with reference to FIGURE 1, wherein the mixing valve illustrated generally at 10 includes a rigid housing 12, which ideally is substantially cylindrical in configuration. The housing 12 is provided with a cold water inlet port 14, and a hot water inlet port 16, which provide fluid to a cylindrical mixing chamber 18, having a mixed fluid outlet port 20. The inner end of the hot water inlet port 16, is defined by a circular valve seat 22, while the inner end of the cold water inlet port 14, is defined by a circular valve seat 24. The unique design of the cold water inlet port is of extreme importance, for it will be noted that the overall configuration of the inlet port is L shaped, so that the cold water valve seat 24 is positioned within the housing 12 in spaced, opposed relationship to the hot water valve seat 22 and is substantially aligned therewith. It is important that the hot water valve seat 22, and the cold water valve seat 24 be placed in opposed relationship, for this facilitates the simultaneous balancing control of the fluid input from both inlet ports.

The hot water valve seat 22 constitutes a circular element having a flange 26 provided upon one end thereof. The flange may be threaded or force-fit into the hot water inlet port 16, and operates to maintain the hot water valve seat 22 in spaced relationship with the inner walls of the hot water inlet port.

The mixing valve 10 is controlled by a novel thermally responsive metering assembly indicated generally at 28, which operates effectively to furnish simultaneous and continuous control of the fluid flow from the input ports 14 and 16 in response to the temperature of mixed fluid in the mixing chamber 18. The metering assembly includes an elongated, tubular power element 30 which is thermally responsive and extends for substantially the entire length of the mixing chamber 18. The power element is substantially the same as that illustrated in my co-pending appication Ser. No. 313,885 now Patent No. 3,319,467 for Thermo-Sensitive Control Device filed Oct. 4, 1963, and is formed with an elongated tubular casing 32 adapted to house a thermally responsive plastic rod 34 snugly received with the casing. One end of the casing 32 is closed, as indicated at 36, and this closed end is engaged by the inner end of the plastic rod 34, while the opposite end of the casing is open to receive a slideable piston 38. The piston 38 extends outwardly beyond the casing 32, and the inner end of the piston enclosed within the casing engages an elastomeric sealing disc 40. The sealing disc 40 is positioned between the inner end of the piston 38 and the outer end of the plastic rod 34, and operates as a positive seal against the ingress of liquid into contact with the plastic rod.

It is imperative that no liquid from within the valve housing 12 be permitted to pass beyond the inner end of the piston 38, for such liquid would upset the temperature response of the power element 30. Therefore, the inner end of the piston 38 is formed with an angular groove 42 which acts as a seat to receive a resilient O ring 44. This O ring provides a tight seal between the piston 38 and the cylindrical casing 32, and, in conjunction with the sealing disc 40, operates to prevent foreign material and water from coming into contact with the plastic rod 34.

The heat responsive plastic rod 34 is preferably formed from polyethylene, although other plastic materials having similar expansion characteristics may be employed. It is only necessary that such thermally responsive plastics do not shrink, exhibit fatigue, or become viscous during expansion, and it has been found that such plastics operate to expand with greater force and to a greater degree than other known elements. For example, rubber, rubber-like materials, silicon, Viton and Buna-n have thermal expansion characteristics which are much lower than that of polyethylene at temperature ranges of from 100 to 250 degrees F., when subjected to the same opposing force. Therefore, such materials cannot be adequately substituted for the plastic rod 34 of the power element 30. Other thermally responsive materials are incapable of expanding against large forces over great distances and additionally, such substances rapidly evidence fatigue distress.

The temperature responsive power element 30 is elongated to extend completely through the center of the mixing chamber 18, and this factor is noteworthy for the drive element is therefore responsive to the temperature of the mixed fluid in all portions of the mixing chamber. Also, the overall sensitivity of the drive element to mixed fluid temperature is proportional to the ratio of the outer circumference of the power element 30 to the inner circumference of the mixing chamber 18.

The power element 30 is supported within the mixing chamber by an end cap 46 which is threaded into the upper end of the housing 12. The end cap 46 is provided with a central threaded aperture 48 which receives a threaded adjusting screw 50. The adjusting screw 50 has a lower flange 52 which is provided with an annular groove 54 to seat a sealing ring 56 so that a tight seal is provided between the inner surface of the end cap 46 and the surface of the flange 52. A central chamber 58 is formed in the adjusting screw 50 to receive the upper end of the thermal responsive power element 30.

A temperature selection handle 60 is permanently secured to the adjusting screw 50, and operates to turn the adjusting screw relative to the end cap 46, thereby threading the adjusting screw into or out of the mixing chamber 18. This action of the temperature selection handle 60 causes longitudinal movement of the power element 30 within the mixing chamber.

The lower end of the power element 30 extends through an aperture 62 in the inner extension of the cold water inlet port 14. Sealing means 64 are provided within the aperture 62 adjacent the drive element to prevent cold water from the inlet port from leaking around the power element and into the mixing chamber 18.

Mounted upon the free end of the piston 38 between the valve seats 22 and 24 is a metering unit 66 for controlling the fluid flow into the mixing chamber from the inlet ports 14 and 16. The metering unit 66 consists of a body 68 which mounts a double valve assembly including a cold water control valve 70 and a hot water control valve 72. The valve 70 is designed to seat against the cold water valve seat 24, while the valve 72 seats against the hot water valve seat 22. The valves 70 and 72 include washer holders 74 and 76 mounted upon the body 68 which form seats for resilient washers 78 and 80. The metering unit is biased toward the mixing chamber 18 by a return spring 82 which extends between the metering unit and the flange 26 of the hot water valve seat 22. This return spring serves the dual function of biasing the cold water control valve 70 against the valve seat 24 and also returning the plastic rod 34 to its normal, unexpanded position when the temperature in the mixing chamber 18 drops below the preset minimum. The plastic employed in the rod 34 tends to maintain an expanded position assumed under the influence of pressure, and a return force must be provided to return the rod to the unexpanded position.

In order to facilitate ease of installation of the mixing valve 10 within a fluid system, threaded coupling adaptors 84, 86 and 88 are provided upon the inlet ports 14 and 16 and the outlet port 20. These coupling adaptors are firmly secured against sealing washers 96, 98 and 100 by coupling nuts 90, 92 and 94 which are threaded onto the external surface of the ports 14, 16 and 20.

Figure 2:
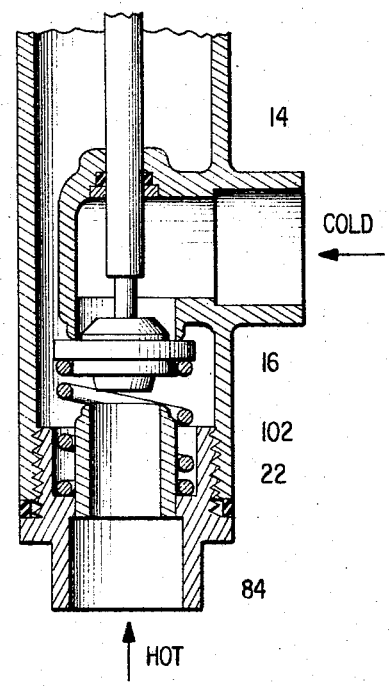
FIGURE 2 is a vertical cross sectional view illustrating an embodiment of the hot fluid inlet section for the mixing valve of the present invention.

The adaptors 84, 86 and 88 are designed for connection directly to a fluid system, and it therefore becomes apparent that the mixing valve 10 may easily be removed from this fluid system by unscrewing the coupling nuts 90, 92 and 94. When such adaptors are employed, the mixing valve may be modified as illustrated by FIGURE 2, so that the hot water valve seat 22 is secured to the adaptor 84 for the hot water inlet port 16. The adaptor 84 may then be removably attached to the hot water inlet port by the coupling nut 90 of FIGURE 1, or, alternatively, the adaptor may be threaded directly into the hot water inlet port as illustrated at 102 in FIGURE 2.

In the operation of the mixing valve 10 of the present invention, the temperature selector handle 60 is turned to the desired temperature setting which may be indicated by suitable indicia provided upon the upper surface of the end cap 46. As the temperature selector handle 60 is turned, the adjusting screw 52 is selectively threaded into or away from the mixing chamber 18 to cause corresponding longitudinal movement of the casing 32 of the temperature responsive power element 30.

The cold water valve 70 is normally seated against the cold water valve seat 24 by the return spring 82 when the thermal power element 30 is inactive. Therefore, when the adjusting screw 48 is threaded downwardly into the mixing chamber 18 by the selector handle 60, the casing 32 of the thermal power element correspondingly moves downward bringing the plastic expansion rod 34 closer to the inner end of the piston 38. Moving the adjusting screw 48 downwardly decreases the temperature at which the fluid in the mixing chamber 18 will be maintained by the thermally responsive power element 30. This becomes apparent when it is noted that the plastic rod 34 expands a fraction of an inch for each degree of temperature rise in the mixing chamber 18, and therefore, by moving the plastic rod closer to the end of the piston 38, it will be obvious that the piston begins to move outwardly at a lower temperature, as contact between the piston and plastic rod occurs earlier. Conversely, however, if the casing 32 is moved away from the mixing chamber by the adjusting screw 48, a space or void will be created between the plastic rod 34 and the inner end of the piston 38, and the plastic rod will not contact the inner end of the piston until a higher temperature in the mixing chamber is reached.

The temperature responsive power element 30 operates effectively to continuously control the temperature of the mixed fluid in the mixing chamber 18. Hot water enters the valve housing 12 through the normally open hot water inlet port 16, and if the temperature of the water in the mixing chamber is lower than the control temperature preset into the power element 30, the water merely passes through the mixing chamber 18 and out through the outlet port 20. However, if the temperature of the water in the mixing chamber is higher than the control setting of the power element, the expandable plastic rod 34 is heated to a point where it contacts the piston 38 and drives the piston outwardly of the casing 32. This causes the cold water valve 70 to be lifted off of the valve seat 24 and a metered volume of cold water is admitted into the mixing chamber 18. At the same time, the movement of the metering unit 66 away from the cold water seat 24 and toward the hot water seat 22 causes a corresponding reduction in the volume of hot water admitted into the mixing chamber 18 and the resultant mixture will be of the precise temperature selected by the temperature selection handle 60.

The metering of the fluid input through the cold water input port 14 and the hot water input port 16 is an ever continuing process. The temperatures of the cold and hot water entering these ports may be continuously changing, but the temperature of the mixed water leaving the valve through the output port 20 is constant and precisely the temperature selected by the selector handle 60, because the plastic rod 34 within the thermal power element 30 is continuously sensing the temperature of the mixed water in the mixing chamber 18 and expanding or contracting to control the flow of water into the mixing chamber. Should a new fluid output temperature be desired, a turn of the selector handle 60 to a new position will provide it.

The mixing valve 10 is trapless because, should hot water begin to radiate into the cold water line through the inlet port 14, the temperature in the mixing chamber 18 will rise causing the plastic rod 34 to expand until the hot water valve 76 seats upon the hot water valve seat 22 and closes off the fluid input through the inlet port 16. Simultaneously, the cold water valve 70 will be moved to a position remote from the cold water valve seat 24, and cold water will again flow into the mixing chamber 18.

In the event of a cold water supply failure, with no cold water entering through the inlet port 14, the plastic rod 34 will expand causing the hot water valve 76 to seat on the hot water valve seat 22 and terminate the supply of hot water to the mixing chamber 18 if the temperature of the hot water exceeds the preset control temperature. Thus an uncontrolled hot water output from the output port 20 is prevented. Conversely, upon the complete failure of the hot water supply to the mixing valve 10, the plastic rod 34 will contract under pressure from the return spring 82 and the cold water valve 70 will seat upon the cold water valve seat 24, thus terminating the flow of cold water to the mixing chamber 18.

The modified mixing valve of FIGURE 3 is somewhat similar in operation and construction to the mixing valve of FIGURE 1 but is modified to provide a more compact and less expensive valve design.

Referring now to FIGURE 3, the valve housing indicated generally at 104 is provided with a hot water inlet port 106 and a cold water inlet port 108 which communicate with a mixing chamber 110. A mixed fluid outlet port 112 operates to pass mixed fluid from the mixing chamber to a fluid system served by the mixing valve.

The open end of the valve housing 104 opposite the outlet port 112 is closed by an end cap 114 which is threaded into the housing at 116 against a circular fluid seal 118. The end cap is removable to provide free access to the internal valve elements through the open end of the valve housing 104.

A cylindrical cold water valve seat assembly 120 is mounted within the upper end of the housing 104 beneath the end cap 114 with the central axis of the valve seat assembly extending substantially perpendicular to the central axis of the cold water inlet port. The cold water valve seat assembly may be press fit or otherwise secured within the end cap 114 and fluid leakage between the cold water valve seat assembly and the valve housing 104 is prevented by a fluid seal 122 compressed between the valve housing and the valve seat assembly. Fluid from the cold water inlet port 108 is admitted into the cold water valve seat assembly through an inlet opening 124 formed therein which is aligned with the inner end of the cold water inlet port. This fluid then passes into the mixing chamber 110 through the lower end of the valve seat assembly which forms a cold water valve seat 126.

The inner end of the hot water inlet port 106 is defined by a circular valve seat 128 which is formed as part of an inner extension of the hot water inlet port. The central axis through the valve seat 128 is substantially perpendicular to the central axis of the inlet port 106, and the valve seat 128 is positioned within the housing 104 in spaced, opposed relationship to the cold water valve seat 126 and is substantially aligned therewith. This opposed aligned relationship of the valve seats 126 and 128 permits simultaneous balancing control of the fluid flowing into the valve housing from the inlet ports 106 and 108.

The mixing valve of FIGURE 3 is thermally controlled by the same thermally responsive power element 30 employed with the mixing valve of FIGURE 1 and for clarity of description the same reference numerals will be employed for the power element. However, in FIGURE 3 the casing 32 of the power element 30 extends through an aperture 130 in the inner extension of the hot water inlet port 106 into the mixing chamber 110 and out through the outlet port 112. The casing is mounted for longitudinal sliding movement relative to the aperture 130, but a sealing ring 132 is provided within the aperture to prevent hot water entering through the inlet port 106 from leaking around the casing 32 and into the mixing chamber 110.

The slideable piston 38 extends outwardly from the open end of the casing 32, and the outermost end of the piston is received within the central bore 134 of an adjusting screw 136. The adjusting screw is threaded into a threaded central aperture 138 in the end cap 114, and includes a lower flange 140 which is provided with an annular groove 142 to seat a sealing ring 144. The sealing ring 144 forms a fluid impervious seal between the inner surface of the cold water valve seat assembly 120 and the corresponding surface of the flange 140 so that the adjusting screw 136 may be threaded into or out from the valve housing 104 without the oocurrence of fluid leakage through the aperture 138.

Unlike the metering unit 66 of FIGURE 1 which is mounted upon the free end of the piston 38, a metering unit 146 in FIGURE 3 is integrally mounted about the open end of the casing 32 between the cold and hot water valve seats 126 and 128. The metering unit 146 consists of a body 148 which mounts a cold water control valve 150 and a hot water control valve 152. The valves 150 and 152 include washer holders 154 and 156 mounted upon the body 148 which form seats for resilient washers 158 and 160. The washer 158 is designed to seat against the cold water valve seat 126 while correspondingly, the washer 160 is designed to seat against the hot water valve seat 128. The metering unit and the casing 32 are biased toward the cold water valve seat 126 by a return spring 162 which extends between the metering unit and the inner extension of the hot water inlet port 106.

In the operation of the mixing valve of FIGURE 3, the adjusting screw 136 is turned to preset a desired maximum temperature into the power element 30. As the adjusting screw is threaded further into the housing 104, the piston 38 is moved into the casing 32 so that the inner end of the piston is brought closer to the plastic rod 34 (not shown in FIGURE 3). This decreases the temperature at which the fluid in the mixing chamber 110 will be maintained, for upon expansion of the plastic rod, contact between the piston and rod will occur earlier. As the plastic rod expands in response to the mixed water temperature in the mixing chamber and the outlet port, it presses against the piston 38 which is prevented from moving by the adjusting screw 138. Therefore the casing 32 is pushed against the bias of the return spring 162 while the piston remains fixed, and the casing is caused to slide downwardly through the aperture 130 to carry the metering unit 146 away from the normally seated position of the cold water control valve 150. With the opening of the cold water inlet port, the metering operation described in connection with the metering valve of FIGURE 1 begins.

Conversely, when the adjusting screw is threaded outwardly from the housing 104, the piston 38 moves out from the open end of the casing 32 and the void between the inner end of the piston and the plastic rod is increased. Thus the maximum preset temperature of the mixed fluid is increased, for a higher temperature must be reached before the plastic rod expands into contact with the piston to initiate the metering operation.

The mixing valve of FIGURE 3 operates precisely in the manner of the valve 10 of FIGURE 1 to effectively accomplish a continuous and simultaneous control of the fluid input from the input ports 106 and 108 in order to maintain a constant temperature fluid output through the output port 112. Movement by the metering unit 146 relative to the input ports results in an increased fluid flow from one port and a corresponding decrease in fluid flow from the remaining port. Additionally, upon a failure of fluid flow through either port, the metering unit will be driven to terminate fluid flow through the remaining port.

The valve housing 104 of FIGURE 3 may be quite short and is designed to define a small mixing chamber 110, for the power element 30 extends beyond the confines of the valve body through the outlet port 112. When the valve is installed in a fluid system, the power element is partially contained within the piping for the mixed water, and thus this piping forms an extension to the mixing chamber. Any length of power element may be employed to provide the necessary degree of metering unit movement and temperature control, and therefore the valve of FIGURE 3 is highly versatile.

It will be apparent to those skilled in the art that the present invention provide a novel fluid mixing valve having simplicity of construction, a high degree of accuracy and reliability, and the capability to generate a powerful and accurately controlled force to regulate both hot and cold fluid input supplies to the valve simultaneously. The arrangement and types of components utilized within this invention may be subject to numerous modifications well within the purview of this inventor who intends only to be limited to a liberal interpretation of the specification and appended claims.

I claim:
1. A fluid mixing valve for mixing fluids of different temperatures to provide a fluid output which is maintained at a preset maximum temperature comprising a valve housing defining an internal mixing chamber, a first fluid input port formed in said housing and communicating with said mixing chamber, a first valve seat mounted on said housing to define the inner end of said first fluid input port, a second fluid input port formed in said valve housing and communicating with said mixing chamber for providing thereto fluid of a lower temperature than the fluid from said first fluid input port, a second valve seat mounted on said housing to define the inner end of said second fluid input port, said second valve seat being disposed in spaced, opposed relationship to said first valve seat and substantially aligned therewith, a fluid outlet formed in said housing and communicating with said mixing chamber, a single fluid metering valve positioned within said housing between said first and second valve seats to simultaneously control in inverse ratio the quantity of both the higher and lower temperature fluids entering the valve housing remote from said fluid metering means, elongated temperature responsive control means directly connected to said manual valve control means and said fluid metering valve and operative to move said fluid metering valve between said first and second valve seats in response to fluid temperature variations in said mixing chamber, said temperature responsive control means extending through said mixing chamber and being formed by a rigid elongated casing mounted within said valve housing for longitudinal movement relative thereto, said casing extending through the length of said mixing chamber and having an open end and a closed end, a thermally sensitive plastic rod received within said casing and abutting the closed end thereof, said plastic rod being expandable as substantially a solid at elevated temperatures, and a drive piston slidably received in said casing and movable outwardly of the open end thereof in response to the expansion of said plastic rod, said manual valve control means being directly connected to said temperature responsive control means and operative to cause relative movement between said plastic rod and piston to control the fluid temperature response of said temperature responsive control means, and a biasing member mounted within said housing, said biasing member operating against said fluid metering valve in opposition to movement of said piston outwardly from said casing to bias said fluid metering valve toward said second valve seat.

2. The fluid mixing valve of claim 1 wherein said manual valve control means is directly connected to the closed end of said casing and operable to move said casing longitudinally of said valve housing to cause relative movement between said plastic rod and piston, said piston being directly connected to said fluid metering valve and positioned to permit movement of said fluid metering valve in the space between the first and second valve seats.

3. The fluid mixing valve of claim 1 wherein said fluid metering valve is secured to said casing adjacent the open end thereof, said manual valve control means being directly connected to said piston and operable to move said piston relative to said plastic rod, said piston operating upon expansion of said plastic rod to move said casing longitudinally of said valve housing to achieve movement of said fluid metering valve in the space between said first and second valve seats.

References Cited
UNITED STATES PATENTS

| | | | |
|---|---|---|---|
| 1,980,310 | 11/1934 | Ames | 236—12 |
| 2,141,520 | 12/1938 | Dube | 236—12 |
| 2,326,096 | 8/1943 | Dillman | 236—12 |
| 2,548,941 | 4/1951 | Brown | 73—363 |
| 2,810,523 | 10/1957 | Branson | 236—12 |
| 3,180,149 | 4/1965 | Woods | 73—358 |

FOREIGN PATENTS 218,013  8/1958  Australia.

EDWARD J. MICHAEL, *Primary Examiner.*
ALDEN D. STEWART, *Examiner.*